United States Patent
Zhang et al.

(10) Patent No.: US 11,476,022 B2
(45) Date of Patent: Oct. 18, 2022

(54) MAGNETIC PARTICLES, METHODS OF MAKING, AND USES THEREOF

(71) Applicant: ROGERS CORPORATION, Chandler, AZ (US)

(72) Inventors: Li Zhang, Luzhou (CN); Yajie Chen, Brighton, MA (US)

(73) Assignee: ROGERS CORPORATION, Chandler, AZ (US)

( * ) Notice: Subject to any disclaimer, the term of this patent is extended or adjusted under 35 U.S.C. 154(b) by 0 days.

(21) Appl. No.: 17/000,610

(22) Filed: Aug. 24, 2020

(65) Prior Publication Data

US 2021/0065943 A1 Mar. 4, 2021

Related U.S. Application Data

(60) Provisional application No. 62/893,872, filed on Aug. 30, 2019.

(51) Int. Cl.
*H01F 1/34* (2006.01)
*C09C 1/24* (2006.01)
(Continued)

(52) U.S. Cl.
CPC .............. *H01F 1/344* (2013.01); *C08K 3/22* (2013.01); *C08K 9/02* (2013.01); *C09C 1/24* (2013.01);
(Continued)

(58) Field of Classification Search
None
See application file for complete search history.

(56) References Cited

U.S. PATENT DOCUMENTS 7,029,514 B1 4/2006 Yang et al.
8,305,281 B2 11/2012 Suetsuna et al.
(Continued)

FOREIGN PATENT DOCUMENTS

EP 2214180 A1 * 8/2010 ............... H01F 1/26
EP 2214180 A1 8/2010
(Continued)

OTHER PUBLICATIONS

Allia et al.; "Fe3O4 nanoparticles and nanocomposites and potential application in biomedicine and in communication technologies: Nanoparticle aggregation, interaction, and effective magnetic anisotropy"; J. of Applied Physics 116; 113903 (2014) 10 pgs.
(Continued)

*Primary Examiner* — Alexandre F Ferre
(74) *Attorney, Agent, or Firm* — Cantor Colburn LLP

(57) ABSTRACT

In an aspect, a composition comprises a plurality of magnetic particles. The magnetic particles each independently comprise a nickel ferrite core having the formula $Ni_{1-x}M_xFe_{2+y}O_4$, wherein M is at least one of Zn, Mg, Co, Cu, Al, Mn, or Cr; x is 0 to 0.95, and y=−0.5 to 0.5; and an iron nickel shell at least partially surrounding the core, wherein the iron nickel shell comprises iron, nickel, and optionally M. In another aspect, a method of forming the magnetic particles comprises heat treating a plurality of nickel ferrite particles in a hydrogen atmosphere to form the plurality of magnetic particles having the iron nickel shell on the nickel ferrite core. In yet another aspect, a composite can comprise the magnetic particles and a polymer.

19 Claims, 3 Drawing Sheets

(51) Int. Cl.
*C08K 9/02* (2006.01)
*C08K 3/22* (2006.01)
*C23C 18/34* (2006.01)

(52) U.S. Cl.
CPC ...... *C01P 2002/60* (2013.01); *C01P 2002/72* (2013.01); *C01P 2004/03* (2013.01); *C01P 2004/61* (2013.01); *C01P 2004/62* (2013.01); *C01P 2004/80* (2013.01); *C01P 2006/42* (2013.01); *C08K 2003/2293* (2013.01); *C08K 2201/005* (2013.01); *C08K 2201/01* (2013.01); *C23C 18/34* (2013.01)

(56) References Cited

U.S. PATENT DOCUMENTS

| | | | |
|---|---|---|---|
| 9,138,727 | B2 | 9/2015 | Greenlee |
| 9,596,755 | B2 | 3/2017 | Sethumadhavan et al. |
| 2003/0129405 | A1 | 7/2003 | Zhang et al. |
| 2003/0190475 | A1 | 10/2003 | Carpenter et al. |
| 2008/0096009 | A1 | 4/2008 | Xiao et al. |
| 2010/0000769 | A1* | 1/2010 | Ohmi ............... H01F 1/26 174/255 |
| 2010/0060539 | A1 | 3/2010 | Suetsuna et al. |
| 2011/0186324 | A1* | 8/2011 | Hur ............... H05K 9/0098 174/34 |
| 2012/0038532 | A1 | 2/2012 | Yonetsu et al. |
| 2012/0049100 | A1 | 3/2012 | Yonetsu et al. |
| 2016/0099498 | A1 | 4/2016 | Pance et al. |
| 2016/0276072 | A1 | 9/2016 | Sethumadhavan et al. |
| 2017/0222331 | A1 | 8/2017 | Pance et al. |
| 2018/0151279 | A1 | 5/2018 | Ueyama et al. |
| 2019/0221343 | A1 | 7/2019 | Chen et al. |
| 2020/0101177 | A1* | 4/2020 | Nandwana ........ C04B 35/62826 |

FOREIGN PATENT DOCUMENTS

| | | |
|---|---|---|
| JP | 6534418 B2 | 6/2019 |
| TW | M417764 | 12/2011 |
| WO | 2016194936 A1 | 12/2016 |
| WO | 2017068444 | 4/2017 |
| WO | 2018043943 A1 | 3/2018 |

OTHER PUBLICATIONS

Han et al.; "Microwave-absorption properties of Fe(Mn)/ferrite nanocapsules"; J. Phys. D: Appl. Phys. 42; (2009) 5 pages.
Liu et al.; "Corrigendum: Electromagnetic-wave-absorption properties of wire-like structures self-assembled by FeCo nanocapsules"; J. Phys. D: Appl. Phys. 45; (2012); 7 pages.
Pal et al.; "Synthesis and magnetic properties of gold coated iron oxide nanoparticles"; Journal of Applied Physics 105; 07B504 (2009); 4 pgs.
Sahu et al.; "Influence of excess Fe accumulation over the surface of FePt nanoparticles: Structural and magnetic properties"; Journal of Applied Physics 113; 134303 (2013); 1 pg Abstract only.
Sharma et al.; "Ultra Low Loss Soft Magnetic Nanoparticles for Applications Up to S-band," Applied Physics Letters, vol. 103, 112402, Sep. 2013.
Zhen et al.; "Microwave absorption properties of FeNi3 submicrometre spheres and SiO2@FeNi3 core-shell structures"; J. Phys. D: Appl. Phys. 43; (2010); 7 pages.
International Search Report; International Application No. PCT/US2020/047580; International Filing Date: Aug. 24, 2020, dated Nov. 25, 2020; 5 pages.
Peng et al., "Microwave absorbing materials using Ag—NiZn ferrite core-shell nanopowders as fillers," Journal of Magnetism and Magnetic Materials, vol. 284, Dec. 2004, pp. 113-119.
Written Opinion; International Application No. PCT/US2020/047580; International Filing Date: Aug. 24, 2020, dated Nov. 25, 2020; 7 pages.

* cited by examiner

MAGNETIC PARTICLES, METHODS OF MAKING, AND USES THEREOF

CROSS-REFERENCE TO RELATED APPLICATION

This application claims the benefit of U.S. Provisional Patent Application Ser. No. 62/893,872 filed Aug. 30, 2019. The related application is incorporated herein in its entirety by reference.

BACKGROUND

Newer designs and manufacturing techniques have driven electronic components to increasingly smaller dimensions, for example, components such as inductors on electronic integrated circuit chips, electronic circuits, electronic packages, modules, housings, and antennas. One approach to reducing electronic component size has been the use of magneto-dielectric materials as substrates. In particular, ferrites, ferroelectrics, and multiferroics have been widely studied as functional materials with enhanced microwave properties. However, these materials are not entirely satisfactory in that they often do not provide the desired bandwidth and they can exhibit a high magnetic loss at high frequencies, such as in the gigahertz range.

Spinel ferrites are potentially attractive for high frequency applications due to their comparatively low dielectric losses. These materials though can have a high resistivity, which prevents eddy currents and ultimately results in additional energy losses. In general, spinel ferrites can be classified as normal and inverse spinels. In the normal spinel structure, such as $ZnFe_2O_4$, the $Zn^{2+}$ ions are at tetrahedral (A) sites and the $Fe^{3+}$ ions at octahedral (B) sites. In the inverse spinel structure, such as $NiFe_2O_4$, the $Ni^{2+}$ ions are at B sites and the $Fe^{3+}$ ions are equally distributed at A and B sites. Alternatively, Ni—Zn ferrites can have a mixed spinel structure with the chemical formula $(Zn_{1-x}Fe_{1-y})[Ni_xFe_{1+y}]O_4$, where the A sites are occupied by $Zn^{2+}$ and $Fe^{3+}$ ions and the B sites are occupied by $Ni^{2+}$ and $Fe^{3+}$ ions.

There accordingly remains a need in the art for a magnetic material with a low magnetic loss in the gigahertz range.

BRIEF SUMMARY

Disclosed herein is a magnetic particle, a method of making, and a composite comprising the same.

In an aspect, a composition comprises a plurality of magnetic particles. The magnetic particles each independently comprise a nickel ferrite core having the formula $Ni_{1-x}M_xFe_{2+y}O_4$, wherein M is at least one of Zn, Mg, Co, Cu, Al, Mn, or Cr; x is 0 to 0.95, and y=−0.5 to 0.5; and an iron nickel shell at least partially surrounding the core, wherein the iron nickel shell comprises iron, nickel, and optionally M.

In another aspect, a method of forming the magnetic particles comprises heat treating a plurality of nickel ferrite particles in a hydrogen atmosphere to form the plurality of magnetic particles having the iron nickel shell on the nickel ferrite core.

In yet another aspect, a composite can comprise the magnetic particles and a polymer.

In still another aspect, an article can comprise the magnetic particles.

The above described and other features are exemplified by the following figures, detailed description, and claims.

BRIEF DESCRIPTION OF THE DRAWINGS

The following Figures are exemplary aspects, wherein the like elements are numbered alike. The figures are illustrative of the disclosure, which are not intended to limit devices made in accordance with the disclosure to the materials, conditions, or process parameters set forth herein.

DETAILED DESCRIPTION

Figure 1:
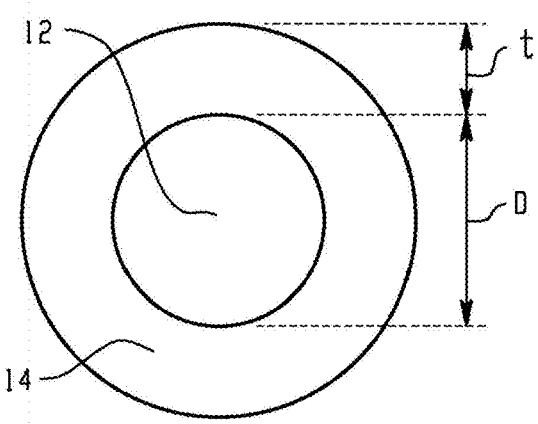
FIG. 1 is an illustration of an aspect of a cross-section of a spherical magnetic particle.

A magnetic particle was developed that comprises a nickel ferrite core and an iron nickel shell. The iron nickel shell has higher saturation magnetization and permeability than the nickel ferrite core, therefore, the presence of the iron nickel shell can be beneficial for permeability improvement of the magnetic particle. For example, the iron nickel shell can exhibit a high permeability and low magnetic loss if the thickness of the iron nickel shell is controlled to be less than the skin depth. The magnetic particle can be used in a polymer composite, enabling a composite with a low magnetic loss and a high magnetic permeability.

The nickel ferrite core can have the formula $Ni_{1-x}M_xFe_{2+y}O_4$, wherein M is at least one of Zn, Mg, Co, Cu, Al, Mn, or Cr; and wherein x is 0 to 0.95, or 0.05 to 0.95 and y is −0.5 to 0.5. M can comprise Co.

The nickel ferrite core can be nanocrystalline in structure. This nanocrystalline structure can improve the electrical resistivity of the material by increasing the number of grain boundaries in the particle. The grain boundaries can be highly disordered and can act as "traps" for carriers (electrons or holes), ultimately suppressing the formation of eddy currents, which can be a dominant cause of magnetic loss at gigahertz range. The nickel ferrite core can have a nanocrystalline structure having a grain size of 5 to 100 nanometers, or 10 to 40 nanometers. The grain size can be measured using transmission electron microscopy or field emission scanning electron microscopy.

The shell of the magnetic particles at least partially surrounds the core. For example, the shell can cover 5 to 100%, or 50 to 100%, or 60 to 95% of the total surface area of the core material. The iron nickel shell comprises both iron and nickel and optionally the element M of the core. The shell can have the formula $Fe_2Ni$ or $Fe_2Ni_{1-x}M_x$, where x is 0 to 0.95. The iron nickel shell can be free of oxygen. As used herein, free of oxygen can mean that there is less than or equal to 5 atomic percent, or 0 to 1 atomic percent, or 0 atomic percent of oxygen based on the total atoms in the iron nickel shell.

The magnetic particles can beneficially be used at high frequencies, for example, at 0.1 to 6 gigahertz, or 1 to 6 gigahertz.

The shape of the magnetic particles is not limited and can comprise at least one of irregularly-shaped particles, spherical particles, flakes, fibers, rod-shaped particles, or needle-shaped particles. The magnetic particles can be solid or hollow. A median D50 particle size by volume of the magnetic particles can be 0.5 to 800 micrometers, or 0.5 to 100 micrometers. The particle size can be determined using Horiba LA-910 laser light scattering PSD analyzer or as determined in accordance with ASTM D4464-15. The magnetic particles can comprise a plurality of platelet shaped magnetic particles having at least one of a longest dimension (length) of 0.5 to 100 micrometers, or 5 to 100 micrometers or a platelet thickness of 0.05 to 1 micrometer, or 0.05 to 0.5 micrometer, with the proviso that the longest dimension is greater than the platelet thickness. The magnetic particles can have an aspect ratio referring to a longest dimension to a shortest dimension (for example, a fiber length to a fiber diameter or a platelet length to a platelet thickness) of greater than or equal to 1, or greater than or equal to 10.

Figure 2:
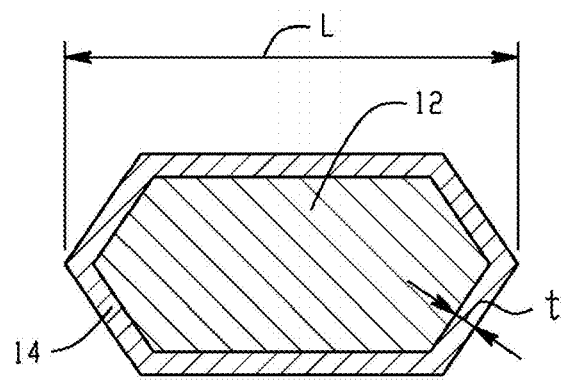
FIG. 2 is an illustration of an aspect of a cross-section of a platelet shaped magnetic particle.

FIG. 1 is an illustration of a cross-section of a magnetic particle (for example, of a sphere or a fiber) having a core 12 and a shell 14. The core 12 of the magnetic particle has a diameter, D, and a shell thickness, t. FIG. 2 is an illustration of a cross-section of a magnetic platelet having a core 12 and a shell 14 the magnetic particle has a longest dimension (length), L, and a shell thickness, t. The magnetic particles can comprise a discrete boundary between the core 12 and the shell 14 (for example, as illustrated in FIG. 1), or a diffuse boundary can be present between the core 12 and the shell 14, where the concentration of iron oxide decreases from a location on the diffuse boundary with increasing distance from a center of the particle for a distance until the concentration optionally plateaus with further increasing distance from the center to the surface of the particle.

The thickness, t, of the shell can be dictated by the desired properties. If the thickness of the shell is too thin, then the shell will not provide the desired magnetic permeability. If the shell is too thick, then the magnetic loss of the particles will be significantly increased. Therefore, the shell thickness can be selected to be able to provide the desired magnetic permeability without resulting in high magnetic loss values. The thickness, t, of the shell can be 0.05 to 20 micrometers, or 0.1 to 10 micrometers.

A method of forming the magnetic particles can comprise heat treating a plurality of nickel ferrite particles in a hydrogen atmosphere to form the iron nickel shell on the nickel ferrite particles. The hydrogen atmosphere comprises hydrogen and can comprise at least one of nitrogen or argon. The hydrogen atmosphere can comprise 1 to 10 volume percent of hydrogen and 90 to 99 volume percent of argon or nitrogen. The heat treating can occur at a temperature of 300 to 1,000° C., or 325 to 500° C. The heat treating can occur for 0.5 to 30 hours, or 1 to 20 hours.

The method of forming the nickel ferrite particles is not limited. In an example, the nickel ferrite particles can be prepared by high energy ball milling. For example, the nickel ferrite particles can be prepared by high energy ball milling an iron oxide (for example, $\alpha\text{-Fe}_2\text{O}_3$), a nickel oxide (for example, NiO), and an optional additional M oxide (for example, a zinc oxide) in hardened chrome steel vials with a plurality of hardened chrome steel balls. Examples of high energy ball mills include SPEX mills, vibrating mills, Cryogenic Grinders, and attrition mills. As used herein, the term high energy ball mill can refer to a mass ratio of the plurality of hardened chrome steel balls to the nickel ferrite precursor compounds being 20:1 to 40:1 during the high energy ball milling. The rotation speed of the vials can be 400 to 600 revolutions per minute. The milling time can be for 2 to 100 hours depending on the formation rate of the nickel ferrite phase.

A composite can comprise the magnetic particles and a polymer. The polymer can comprise a thermoplastic or a thermoset. As used herein, the term "thermoplastic" refers to a material that is plastic or deformable, melts to a liquid when heated, and freezes to a brittle, glassy state when cooled sufficiently. Examples of thermoplastic polymers that can be used include cyclic olefin polymers (including polynorbornenes and copolymers containing norbornenyl units, for example, copolymers of a cyclic polymer such as norbornene and an acyclic olefin such as ethylene or propylene), fluoropolymers (for example, polyvinyl fluoride (PVF), polyvinylidene fluoride (PVDF), fluorinated ethylene-propylene (FEP), polytetrafluoroethylene (PTFE), poly (ethylene-tetrafluoroethylene (PETFE), or perfluoroalkoxy (PFA)), polyacetals (for example, polyoxyethylene and polyoxymethylene), poly($C_{1-6}$ alkyl)acrylates, polyacrylamides (including unsubstituted and mono-N— or di-N—($C_{1-8}$ alkyl)acrylamides), polyacrylonitriles, polyamides (for example, aliphatic polyamides, polyphthalamides, or polyaramides), polyamideimides, polyanhydrides, polyarylene ethers (for example, polyphenylene ethers), polyarylene ether ketones (for example, polyether ether ketones (PEEK) or polyether ketone ketones (PEKK)), polyarylene ketones, polyarylene sulfides (for example, polyphenylene sulfides (PPS)), polyarylene sulfones (for example, polyethersulfones (PES), polyphenylene sulfones (PPS), or the like), polybenzothiazoles, polybenzoxazoles, polybenzimidazoles, polycarbonates (including homopolycarbonates or polycarbonate copolymers such as polycarbonate-siloxanes, polycarbonate-esters, or polycarbonate-ester-siloxanes), polyesters (for example, polyethylene terephthalates, polybutylene terephthalates, polyarylates, or polyester copolymers such as polyester-ethers), polyetherimides (for example, copolymers such as polyetherimide-siloxane copolymers), polyimides (for example, copolymers such as polyimide-siloxane copolymers), poly($C_{1-6}$ alkyl)methacrylates, polyalkylacrylamides (for example, unsubstituted or mono-N— or di-N—($C_{1-8}$ alkyl)acrylamides), polyolefins (for example, polyethylenes, such as high density polyethylene (HDPE), low density polyethylene (LDPE), or linear low density polyethylene (LLDPE), polypropylenes, or their halogenated derivatives (such as polytetrafluoroethylenes), or their copolymers, for example ethylene-alpha-olefin copolymers), polyoxadiazoles, polyoxymethylenes, polyphthalides, polysilazanes, polysiloxanes (silicones), polystyrenes (for example, copolymers such as acrylonitrile-butadiene-styrene (ABS) or methyl methacrylate-butadiene-styrene (MBS)), polysulfides, polysulfonamides, polysulfonates, polysulfones, polythioesters, polytriazines, polyureas, polyurethanes, vinyl polymers (for example, polyvinyl alcohols, polyvinyl esters, polyvinyl ethers, polyvinyl halides (for example, polyvinyl chloride), polyvinyl ketones, polyvinyl nitriles, or polyvinyl thioethers), a paraffin wax, or the like. A combination comprising at least one of the foregoing thermoplastic polymers can be used.

Thermoset polymers are derived from thermosetting monomers or prepolymers (resins) that can irreversibly harden and become insoluble with polymerization or cure, which can be induced by heat or exposure to radiation (for example, ultraviolet light, visible light, infrared light, or electron beam (e-beam) radiation). Thermoset polymers include alkyds, bismaleimide polymers, bismaleimide triazine polymers, cyanate ester polymers, benzocyclobutene polymers, benzoxazine polymers, diallyl phthalate polymers, epoxies, hydroxymethylfuran polymers, melamine-formaldehyde polymers, phenolics (including phenol-formaldehyde polymers such as novolacs and resoles), benzoxazines, polydienes such as polybutadienes (including homopolymers and copolymers thereof, for example, poly (butadiene-isoprene)), polyisocyanates, polyureas, polyurethanes, triallyl cyanurate polymers, triallyl isocyanurate polymers, certain silicones, or polymerizable prepolymers (for example, prepolymers having ethylenic unsaturation, such as unsaturated polyesters, polyimides), or the like. The prepolymers can be polymerized, copolymerized, or crosslinked, for example, with a reactive monomer such as styrene, alpha-methylstyrene, vinyltoluene, chlorostyrene, acrylic acid, (meth)acrylic acid, a ($C_{1-6}$ alkyl)acrylate, a ($C_{1-6}$ alkyl) methacrylate, acrylonitrile, vinyl acetate, allyl acetate, triallyl cyanurate, triallyl isocyanurate, or acrylamide.

The polymer can comprise at least one of a fluoropolymer (for example, polyvinylidene fluoride (PVDF) or polytetrafluoroethylene (PTFE)), a polyolefin (for example, polyethylene (PE), high density polyethylene (HDPE), or low density polyethylene (LDPE)), a poly(arylene ether ketone) (for example, polyether ether ketone (PEEK)), a poly alkyl (meth)acrylate (for example, polymethylmethacrylate (PMMA)), or a poly(ether sulfone).

A method of forming the composite is not limited and can comprise at least one of compression molding, injection molding, reaction injection molding, extruding, or the like.

The composite can comprise 10 to 95 volume percent, or 30 to 70 volume percent of the magnetic particles based on the total volume of the composite. The composite can comprise 10 to 90 volume percent, or 30 to 70 volume percent of the polymer based on the total volume of the composite.

Figure 3:
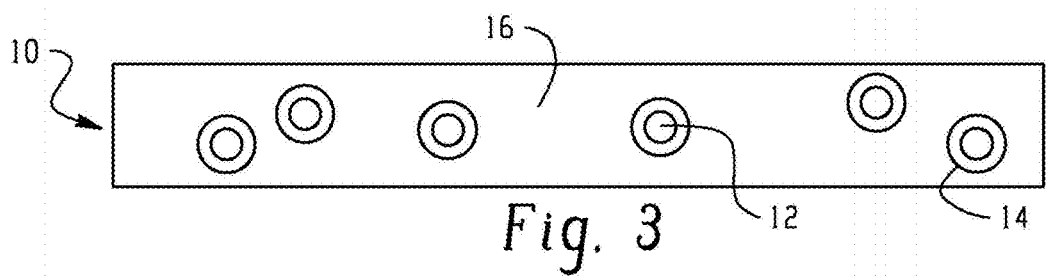
FIG. 3 is an illustration of an aspect of a composite comprising the magnetic particle.

An illustration of an aspect of the composite is illustrated in FIG. 3. FIG. 3 illustrates that composite 10 comprises a polymer matrix 16 and a plurality of magnetic particles comprising core 12 and shell 14.

The polymer composite comprising the magnetic particles can have a permeability at 1 GHz, or 0.5 to 3 gigahertz, or 1 to 5 GHz of greater than or equal to 1.4, or 1.4 to 2.5. The polymer composite comprising the magnetic particles can have a permeability at 1 GHz, or 1 to 3 gigahertz, or 1 to 5 GHz of greater than or equal to 1, or 1.5 to 3, or 3 to 5. The polymer composite comprising the magnetic particles can have a magnetic loss tangent of less than or equal to 0.05 at 1 to 3 gigahertz, or 0.001 to 0.02, or 0.01 to 0.01 at 0.5 to 2.5 gigahertz, or 0.5 to 2 gigahertz. Magnetic materials with such a low magnetic loss can advantageously be used in high frequency applications such as in antenna applications.

The polymer composite comprising the magnetic particles can have a permittivity at 1 GHz, or 1 to 3 gigahertz, or 1 to 5 GHz of less than or equal to 60, or less than or equal to 30, or 10 to 60. The polymer composite comprising the magnetic particles can have a dielectric loss tangent at 1 GHz, or 1 to 3 gigahertz, or 1 to 5 GHz of less than or equal to 0.2, or less than or equal to 0.05, or less than or equal to 0.005, or 0.001 to 0.2, or 0.3 to 0.5.

The electromagnetic properties of the magnetic particles can be determined using a Vector Network Analyzer (VNA) with a coaxial line using the Nicholson-Ross-Weir (NRW) method. The permittivity and the permeability can be determined at a temperature of 23° C.

An article can comprise the magnetic particles. The article can be a microwave device, such as an antenna or an inductor. The article can be a transformer, an inductor, or an anti-electromagnetic interface material. The article can be an antenna such as a patch antenna, an inverted-F antenna, or a planar inverted-F antenna. The article can be a magnetic bus bar, for example, for wireless charging; an NFC shielding material; or an electronic bandgap meta-material. The magnetic particles can be used in microwave absorption or microwave shielding applications.

The composition can comprise a plurality of magnetic particles, wherein the magnetic particles each independently comprise a nickel ferrite core having the formula $Ni_{1-x}M_xFe_{2+y}O_4$, wherein M is at least one of Zn, Mg, Co, Cu, Al, Mn, or Cr; x is 0 to 0.95, and y=−0.5 to 0.5; and an iron nickel shell at least partially surrounding the core, wherein the iron nickel shell comprises iron, nickel, and optionally M. M can comprise at least one of Zn or Co. The nickel ferrite core can have an average grain size of 5 to 100 nanometers, or 10 to 40 nanometers. In the formula, x can be 0.05 to 0.95. M can comprise at least one of Co or Zn. The shell can be free of oxygen. The plurality of magnetic particles can comprise at least one irregularly-shaped particles, spherical particles, oval particles, rod-shaped particles, flakes, or fibers. The plurality of magnetic particles can have a median D50 particle size of 0.5 to 800 micrometers, or 0.5 to 100 micrometers. The shell can have an average thickness of 0.05 to 20 micrometers, or 0.1 to 10 micrometers. At least a portion of the plurality of magnetic particles can be platelets and the platelets can have at least one of a longest dimension of 0.5 to 100 micrometers, or 5 to 100 micrometers, or a platelet thickness of 0.05 to 1 micrometer, or 0.05 to 0.5 micrometer, with the proviso that the longest dimension is greater than the platelet thickness. An article can comprise the composition. The article can be an antenna, a transformer, an anti-electromagnetic interface material, or an inductor; and/or the article can be a microwave device.

A method of forming the composition can comprise heat treating a plurality of nickel ferrite particles in a hydrogen atmosphere to form a plurality of magnetic particles having the iron nickel shell on the nickel ferrite core; wherein the magnetic particles each independently comprise a nickel ferrite core having the formula $Ni_{1-x}M_xFe_{2+y}O_4$, wherein M is at least one of Zn, Mg, Co, Cu, Al, Mn, or Cr; x is 0 to 0.95, and y=−0.5 to 0.5; and an iron nickel shell at least partially surrounding the core, wherein the iron nickel shell comprises iron, nickel, and optionally M. The heat treating can comprise heating the nickel ferrite particles to a temperature of 300 to 1,000° C., or 325 to 500° C. The hydrogen atmosphere can further comprise least one of nitrogen or argon. The inert atmosphere can comprise 1 to 10 volume percent of hydrogen and 90 to 99 volume percent of argon or nitrogen. The method can comprise forming the plurality of nickel ferrite particles by high energy ball mixing; wherein the high energy ball mixing comprises mixing nickel ferrite precursor compounds in a hardened chrome steel vial comprising a plurality of hardened chrome steel balls; wherein a mass ratio of the plurality of hardened chrome steel balls to the nickel ferrite precursor compounds is 20:1 to 40:1 during the high energy ball milling.

A composite can comprise a polymer and a plurality of magnetic particles; wherein the magnetic particles each independently comprise a nickel ferrite core having the formula $Ni_{1-x}M_xFe_{2+y}O_4$, wherein M is at least one of Zn, Mg, Co, Cu, Al, Mn, or Cr; x is 0 to 0.95, and y=−0.5 to 0.5; and an iron nickel shell at least partially surrounding the core, wherein the iron nickel shell comprises iron, nickel, and optionally M. The polymer can comprise at least one of a fluoropolymer (for example, polyvinylidene fluoride (PVDF) or polytetrafluoroethylene (PTFE)), a polyolefin (for example, polyethylene (PE), high density polyethylene (HDPE), or low density polyethylene (LDPE)), a poly (arylene ether ketone) (for example, polyether ether ketone (PEEK)), a poly alkyl (meth)acrylate (for example, polymethylmethacrylate (PMMA)), or a poly(ether sulfone). The composite can comprise 10 to 95 volume percent, or 30 to 70 volume percent of the magnetic particles based on the total volume of the composite; and 10 to 90 volume percent, or 30 to 70 volume percent of the polymer based on the total volume of the composite. The composite can have a permeability at 1 GHz, or 0.5 to 3 gigahertz, or 1 to 5 GHz of greater than or equal to 1.4, or 1.4 to 2.5. The composite can have a magnetic loss tangent of less than or equal to 0.05 at 1 to 3 gigahertz, or 0.001 to 0.02, or 0.01 to 0.01 at 0.5 to 2.5 gigahertz, or 0.5 to 2 gigahertz. The composite can have a permittivity at 1 GHz, or 1 to 3 gigahertz, or 1 to 5 GHz of less than or equal to 60, or 10 to 60. The composite can have a dielectric loss tangent at 1 GHz, or 1 to 3 gigahertz, or 1 to 5 GHz of less than or equal to 0.2, or less than or equal to 0.05, or less than or equal to 0.005, or 0.001 to 0.2. An article can comprise the composite. The article can be an antenna, a transformer, an anti-electromagnetic interface material, or an inductor; and/or the article can be a microwave device.

The following examples are provided to illustrate the present disclosure. The examples are merely illustrative and are not intended to limit devices made in accordance with the disclosure to the materials, conditions, or process parameters set forth therein.

EXAMPLES

In order to determine the electromagnetic properties of the magnetic particles, the magnetic particles were mixed with paraffin and pressed into 3×7×2 millimeter toroids for the electromagnetic property measurement (magnetic permeability and permittivity) by Vector Network Analyzer (VNA) with a coaxial line in Nicholson-Ross-Weir (NRW) method. The permittivity and the permeability can be determined at a temperature of 23° C.

Example 1: Preparation of Magnetic Particles

Figure 4:
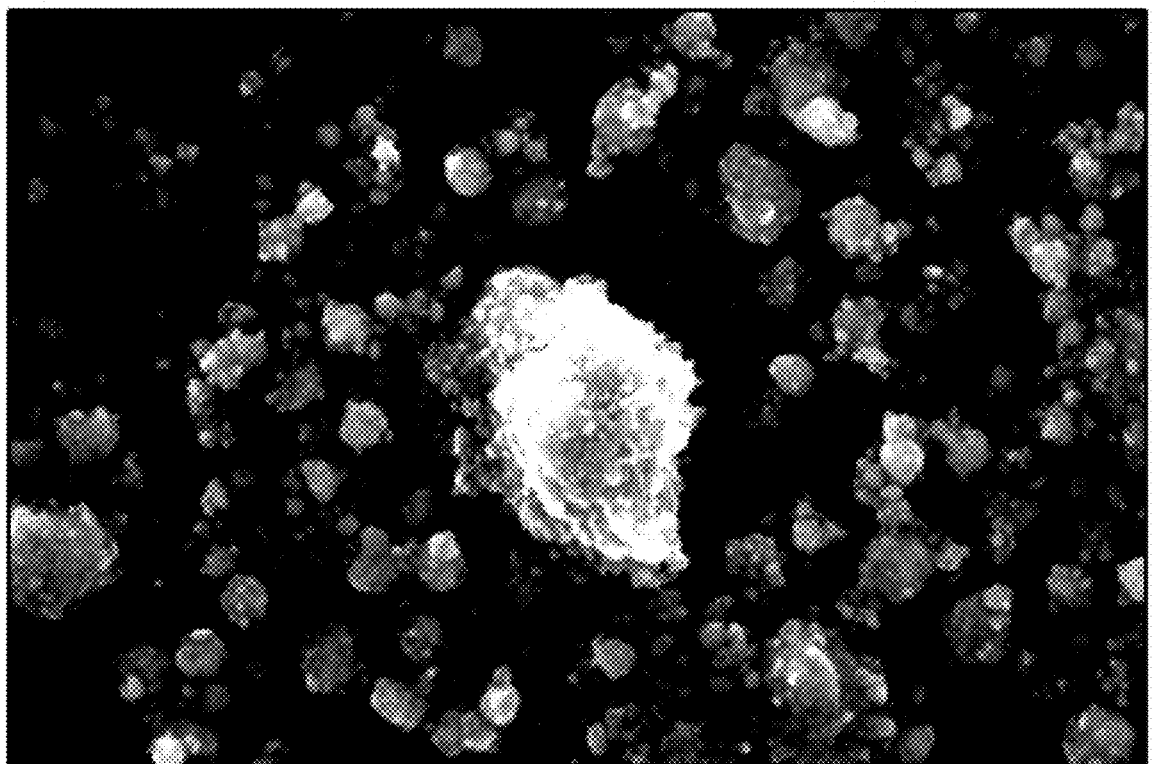
FIG. 4 is a scanning electron microscopy image of the magnetic particles of Example 1.

A 30 gram mixture of α-$Fe_2O_3$ and NiO was formed using the stoichiometric amounts to obtain $NiFe_2O_4$. The mixture was loaded to a planetary ball mill containing hardened chrome steel vials (500 milliliters in volume) and 10 millimeter hardened chrome steel balls. The ball to powder mass ratio was 30:1. The milling was performed in air at 500 revolutions per minute (rpm) for 30 hours. The synthesized $NiFe_2O_4$ power was heat treated in an atmosphere of 5 volume percent $H_2$ and 95 volume percent Ar at 350° C. to control the nanocrystalline structure and to form the FeNi shell. A scanning electron microscopy image of the core-shell particles is shown in FIG. 4.

Figure 5:
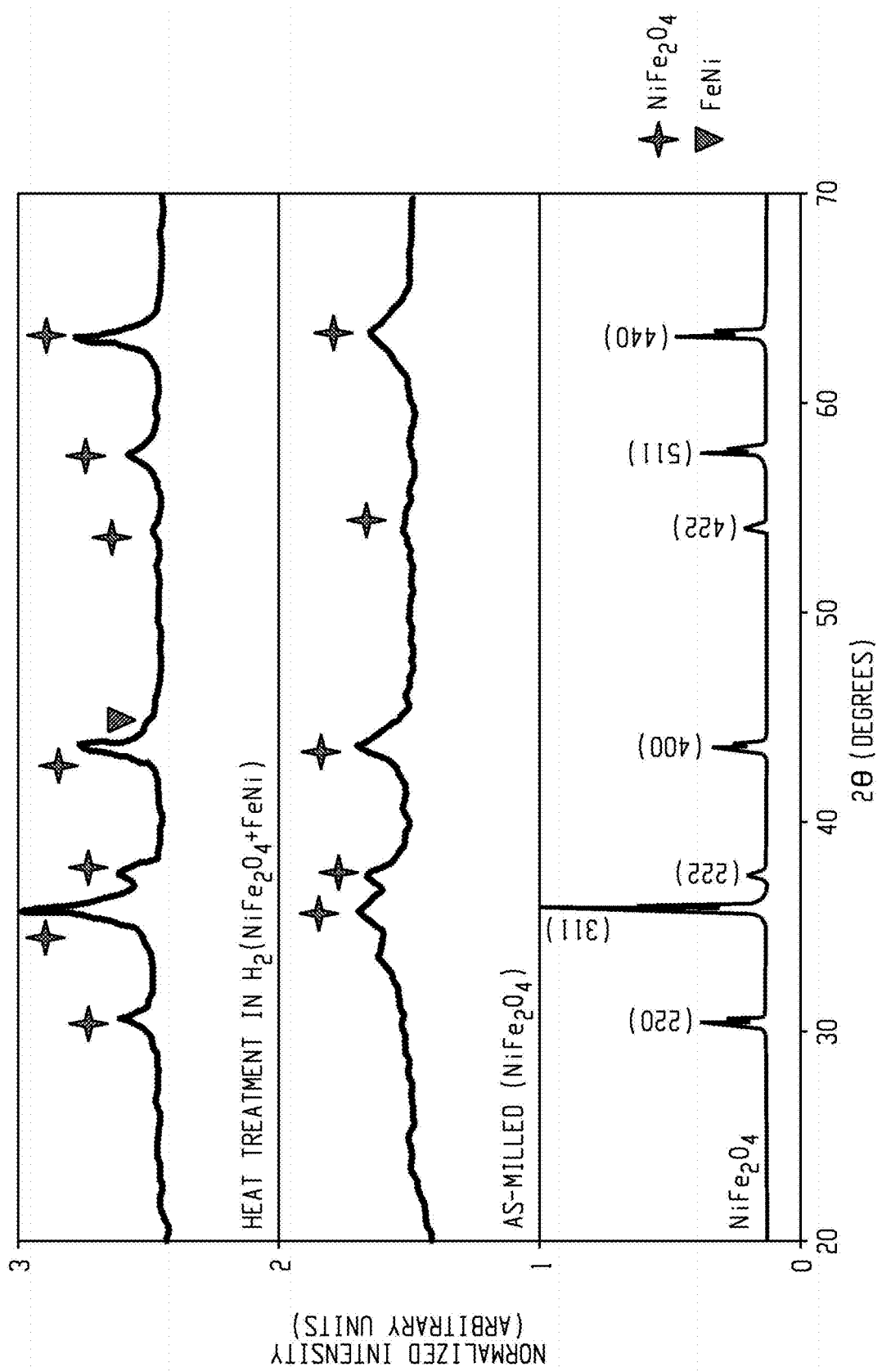
FIG. 5 is a graphical illustration of the x-ray diffraction analysis of the magnetic particles of Example 1.

The sample was studied using X-ray diffraction before milling, after milling, and after heat treating to form the shell and the results are shown in FIG. 5. FIG. 5 shows the presence of an FeNi peak after the heat treating indicating the formation of the FeNi shell.

Figure 6:
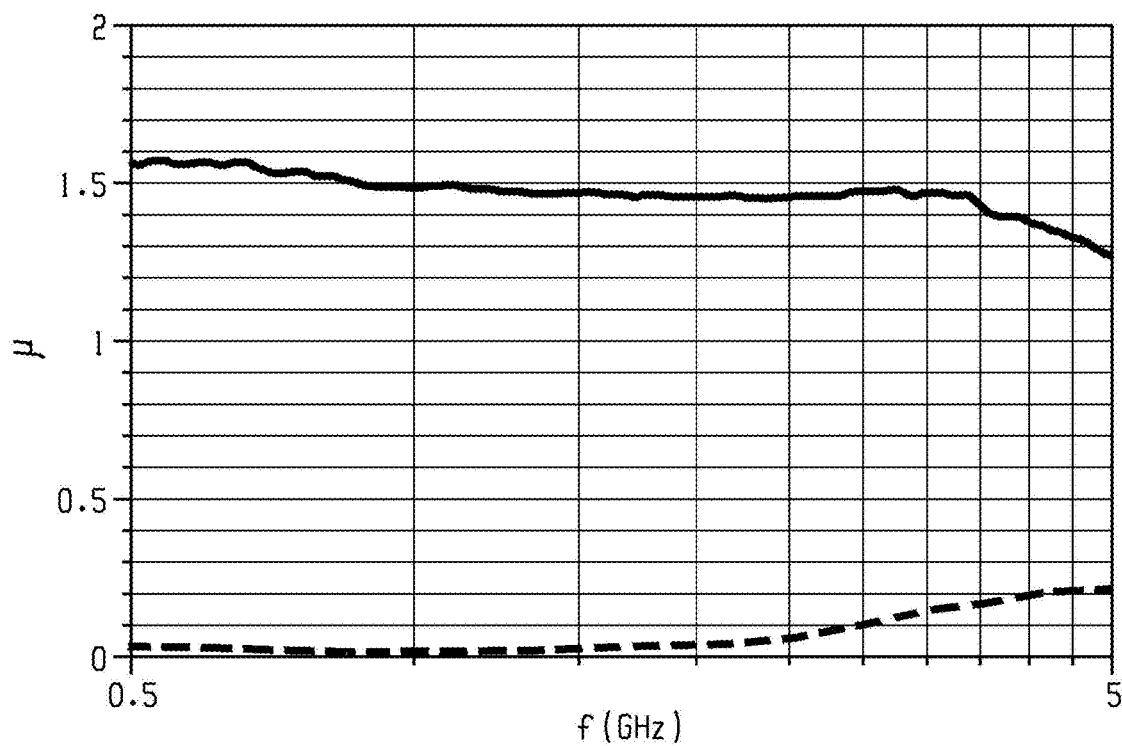
FIG. 6 is a graphical illustration of the complex permeability spectra of Example 1.

The $NiFe_2O_4$—FeNi core-shell particles were blended in paraffin wax to form a composite comprising 60 volume percent of the magnetic particles, followed by compression into a toroid shape. The magnetic and dielectric properties of the composite were then determined over the frequency range of 0.1 to 8.5 GHz. The real part (solid line) and imaginary part of magnetic permeability (dashed line) are shown in FIG. 6 and values thereof are provided in Table 1.

TABLE 1

| f (GHz) | 0.5 | 1 | 2 | 3 |
|---|---|---|---|---|
| µ' | 1.57 | 1.49 | 1.46 | 1.48 |
| Tanδ | 0.021 | 0.015 | 0.026 | 0.070 |
| Tanδ/µ' | 0.013 | 0.010 | 0.018 | 0.047 |

Table 1 shows that the composite can achieve a permeability of greater than 1.4 and a magnetic loss tangent of less than 0.075 over the frequency range of 0.5 to 3 gigahertz.

Example 2: Preparation of Magnetic Particles

Figure 7:
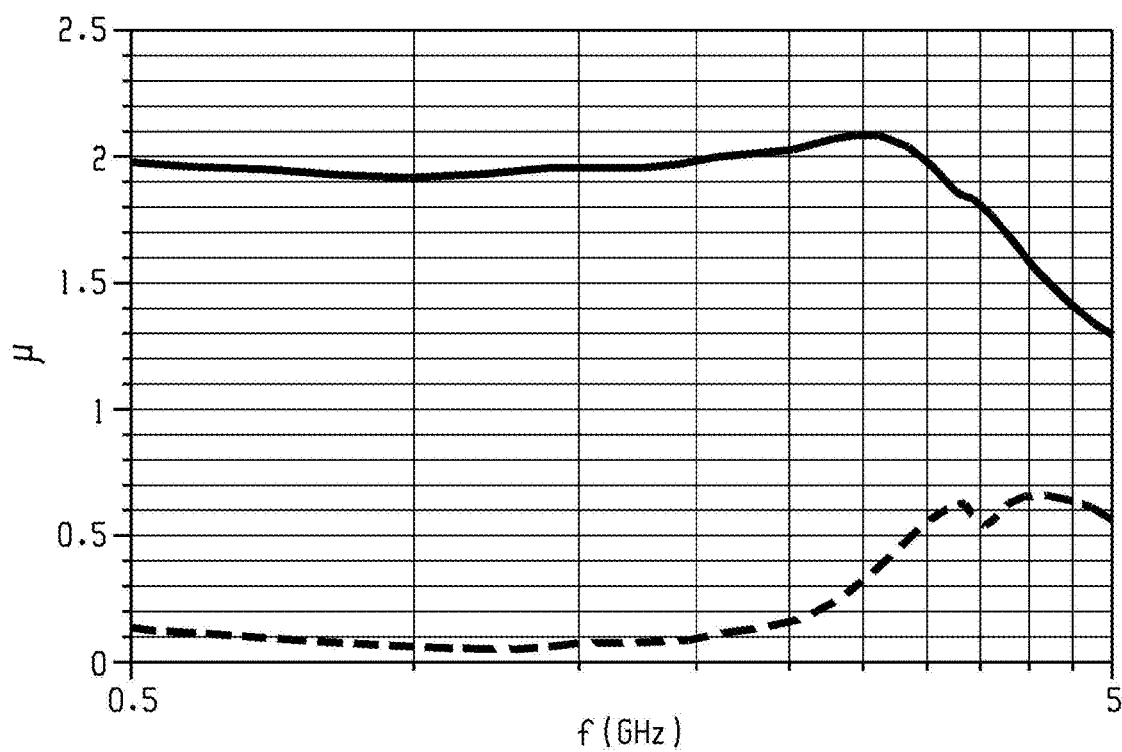
FIG. 7 is a graphical illustration of the complex permeability spectra of Example 2.

Core-shell particles were prepared in accordance with Example 1 except that the synthesized $NiFe_2O_4$ power was heat treated in an atmosphere of 5 volume percent $H_2$ and 95 volume percent Ar at 380° C. to control the nanocrystalline structure and to form the FeNi shell. The increased temperature facilitates the reduction reaction, ultimately resulting in an increased thickness of the nickel ferrite shell. The $NiFe_2O_4$—FeNi core-shell particles were blended with paraffin wax to form a composite comprising 60 volume percent of the magnetic particles, followed by compression into a toroid shape. The magnetic and dielectric properties of the composite were then determined over the frequency range of 0.1 to 8.5 GHz. The real part (solid line) and imaginary part of magnetic permeability (dashed line) are shown in FIG. 7 and values thereof are provided in Table 2.

TABLE 2

| f (GHz) | 0.5 | 1 | 2 | 3 |
|---|---|---|---|---|
| µ' | 1.99 | 1.92 | 2.00 | 2.09 |
| Tan δ | 0.069 | 0.032 | 0.047 | 0.153 |
| Tanδ/µ' | 0.035 | 0.017 | 0.024 | 0.073 |

Table 2 shows that the composite can achieve a permeability of greater than 1.9 and a magnetic loss tangent of less than 0.16 over the frequency range of 0.5 to 3 gigahertz.

Set for the below are various non-limiting aspects of the disclosure.

Aspect 1: A composition, comprising: a plurality of magnetic particles, wherein the magnetic particles each independently comprise a nickel ferrite core having the formula $Ni_{1-x}M_xFe_{2+y}O_4$, wherein M is at least one of Zn, Mg, Co, Cu, Al, Mn, or Cr; x is 0 to 0.95, and y=−0.5 to 0.5; and an iron nickel shell at least partially surrounding the core, wherein the iron nickel shell comprises iron, nickel, and optionally M.

Aspect 2: The composition of Aspect 1, wherein M comprises at least one of Zn or Co.

Aspect 3: The composition of any one of the preceding aspects, wherein the nickel ferrite core has an average grain size of 5 to 100 nanometers, or 10 to 40 nanometers.

Aspect 4: The composition of any one or more of the preceding aspects, wherein x is 0.05 to 0.95.

Aspect 5: The composition of any one or more of the preceding aspects, wherein M comprises at least one of Co or Zn.

Aspect 6: The composition of any one or more of the preceding aspects, wherein the shell is free of oxygen.

Aspect 7: The composition of any one or more of the preceding aspects, wherein the plurality of magnetic particles comprises at least one of irregularly-shaped particles, spherical particles, oval particles, rod-shaped particles, flakes, or fibers.

Aspect 8: The composition of any one or more of the preceding aspects, wherein the plurality of magnetic particles has a median D50 particle size of 0.5 to 800 micrometers, or 0.5 to 100 micrometers.

Aspect 9: The composition of any one or more of the preceding aspects, wherein the shell has an average thickness of 0.05 to 20 micrometers, or 0.1 to 10 micrometers.

Aspect 10: The composition of any one or more of the preceding aspects, wherein at least a portion of the plurality of magnetic particles are platelets; wherein the platelets have at least one of a longest dimension of 0.5 to 100 micrometers, or 5 to 100 micrometers, or a platelet thickness of 0.05 to 1 micrometer, or 0.05 to 0.5 micrometer, with the proviso that the longest dimension is greater than the platelet thickness.

Aspect 11: A method of forming the composition of any one or more of the preceding aspects, comprising heat treating a plurality of nickel ferrite particles in a hydrogen atmosphere to form the plurality of magnetic particles having the iron nickel shell on the nickel ferrite core.

Aspect 12: The method of Aspect 11, wherein the heat treating comprises heating the nickel ferrite particles to a temperature of 300 to 1,000° C., or 325 to 500° C.

Aspect 13: The method of any one or more of Aspects 11 to 12, wherein the hydrogen atmosphere further comprises least one of nitrogen or argon.

Aspect 14: The method of any one or more of Aspects 11 to 13, where in the inert atmosphere comprises 1 to 10 volume percent of hydrogen and 90 to 99 volume percent of argon or nitrogen.

Aspect 15: The method of any one or more of Aspects 11 to 14, further comprising forming the plurality of nickel ferrite particles by high energy ball mixing; wherein the high energy ball mixing comprises mixing nickel ferrite precursor compounds in a hardened chrome steel vial comprising a plurality of hardened chrome steel balls; wherein a mass ratio of the plurality of hardened chrome steel balls to the nickel ferrite precursor compounds is 20:1 to 40:1 during the high energy ball milling.

Aspect 16: A composite comprising: a plurality of magnetic particles, for example, the plurality of magnetic particles of any one or more of Aspects 1 to 10; and a polymer.

Aspect 17: The composite of Aspect 16, wherein the polymer comprises at least one of a fluoropolymer (for example, polyvinylidene fluoride (PVDF) or polytetrafluoroethylene (PTFE)), a polyolefin (for example, polyethylene (PE), high density polyethylene (HDPE), or low density polyethylene (LDPE)), a poly(arylene ether ketone) (for example, polyether ether ketone (PEEK)), a poly alkyl (meth)acrylate (for example, polymethylmethacrylate (PMMA)), or a poly(ether sulfone).

Aspect 18: The composite of any one or more of Aspects 16 to 17, wherein the composite comprises 10 to 95 volume percent, or 30 to 70 volume percent of the magnetic particles based on the total volume of the composite; and 10 to 90 volume percent, or 30 to 70 volume percent of the polymer based on the total volume of the composite.

Aspect 19: The composite of any one or more of Aspects 16 to 18, wherein the composite has a permeability at 1 GHz, or 0.5 to 3 gigahertz, or 1 to 5 GHz of greater than or equal to 1.4, or 1.4 to 2.5.

Aspect 20: The composite of any one or more of Aspects 16 to 19, wherein the composite has a magnetic loss tangent of less than or equal to 0.05 at 1 to 3 gigahertz, or 0.001 to 0.02, or 0.01 to 0.01 at 0.5 to 2.5 gigahertz, or 0.5 to 2 gigahertz.

Aspect 21: The composite of any one or more of Aspects 16 to 20, wherein the composite has a permittivity at 1 GHz, or 1 to 3 gigahertz, or 1 to 5 GHz of less than or equal to 60, or 10 to 60.

Aspect 22: The composite of any one or more of Aspects 16 to 21, wherein the composite has a dielectric loss tangent at 1 GHz, or 1 to 3 gigahertz, or 1 to 5 GHz of less than or equal to 0.2, or less than or equal to 0.05, or less than or equal to 0.005, or 0.001 to 0.2.

Aspect 23: An article comprising the composite of any one or more of Aspects 16 to 22.

Aspect 24: The article of Aspect 23, wherein the article is an antenna, a transformer, an anti-electromagnetic interface material, or an inductor; and/or wherein the article is a microwave device.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced item. The term "or" means "and/or" unless clearly indicated otherwise by context. Reference throughout the specification to "an aspect", "another aspect", "some aspect", and so forth, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

The endpoints of all ranges directed to the same component or property are inclusive of the endpoints, are independently combinable, and include all intermediate points and ranges. For example, ranges of "up to 25 vol %, or 5 to 20 vol %" is inclusive of the endpoints and all intermediate values of the ranges of "5 to 25 vol %," such as 10 to 23 vol %, etc.

The term "at least one of" means that the list is inclusive of each element individually, as well as combinations of two or more elements of the list, and combinations of at least one element of the list with like elements not named. Also, the term "combination" is inclusive of blends, mixtures, alloys, reaction products, and the like.

Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A composition, comprising:
a plurality of magnetic particles, wherein the magnetic particles each independently comprise
a nickel ferrite core having the formula $Ni_{1-x}M_xFe_{2+y}O_4$, wherein M is at least one of Zn, Mg, Co, Cu, Al, Mn, or Cr; x is 0 to 0.95, and y=−0.5 to 0.5; and
an iron nickel shell at least partially surrounding the core, wherein the iron nickel shell has the formula $Fe_2Ni_{1-x}M_x$.

2. The composition of claim 1, wherein M comprises at least one of Zn, Al, or Co.

3. The composition of claim 1, wherein the nickel ferrite core has an average grain size of 5 to 100 nanometers.

4. The composition of claim 1, wherein x is 0.05 to 0.95.

5. The composition of claim 1, wherein M comprises at least one of Co or Zn.

6. The composition of claim 1, wherein the plurality of magnetic particles comprises at least one of irregularly-shaped particles, spherical particles, oval particles, rod-shaped particles, flakes, or fibers.

7. The composition of claim 1, wherein the plurality of magnetic particles has a median D50 particle size of 0.5 to 800 micrometers; and wherein the nickel ferrite core has an average grain size of 5 to 100 nanometers.

8. The composition of claim 1, wherein the shell has an average thickness of 0.05 to 20 micrometers.

9. The composition of claim 1, wherein at least a portion of the plurality of magnetic particles are platelets; wherein the platelets have at least one of a longest dimension of 0.5 to 100 micrometers or a platelet thickness of 0.05 to 1 micrometer, with the proviso that the longest dimension is greater than the platelet thickness.

10. A composite comprising:
the plurality of magnetic particles of claim 1; and
a polymer.

11. The composite of claim 10, wherein the polymer comprises at least one of a fluoropolymer, a polyolefin, a poly(arylene ether ketone), a poly alkyl (meth)acrylate, or a poly(ether sulfone); and/or
wherein the composite comprises 10 to 95 volume percent of the magnetic particles based on the total volume of the composite; and 10 to 90 volume percent of the polymer based on the total volume of the composite.

12. The composite of claim 10, wherein the composite has at least one of
a permeability at 1 GHz of greater than or equal to 1.4;
a magnetic loss tangent of less than or equal to 0.05 at 1 to 3 gigahertz;
a permittivity at 1 GHz of less than or equal to 60; or
a dielectric loss tangent at 1 GHz of less than or equal to 0.

13. An article comprising the composite of claim 10, wherein the article is an antenna, a transformer, an anti-electromagnetic interface material, or an inductor; and/or wherein the article is a microwave device.

14. A composition, comprising:
a plurality of magnetic particles, wherein the magnetic particles each independently comprise
a nickel ferrite core having the formula $Ni_{1-x}M_xFe_{2+y}O_4$, wherein M is at least one of Zn, Mg, Co, Cu, Al, Mn, or Cr; x is 0 to 0.95, and y=−0.5 to 0.5; wherein the nickel ferrite core has a nanocrystalline structure; and
an iron nickel shell at least partially surrounding the core, wherein the iron nickel shell comprises iron, nickel, and optionally M,
wherein the plurality of magnetic particles has a median D50 particle size of 0.5 to 800 micrometers; and wherein the nickel ferrite core has an average grain size of 5 to 100 nanometers.

15. A composition comprising:
a plurality of magnetic particles; wherein the magnetic particles each independently comprise
a nickel ferrite core having the formula $Ni_{1-x}M_xFe_{2+y}O_4$, wherein M is at least one of Zn, Mg, Co, Cu, Al, Mn, or Cr; x is 0 to 0.95, and y=−0.5 to 0.5; and
an iron nickel shell at least partially surrounding the core, wherein the iron nickel shell comprises iron, nickel, and optionally M; wherein the iron nickel shell comprises less than or equal to 5 atomic percent of oxygen based on the total atoms in the iron nickel shell.

16. A method of forming a composition comprising a plurality of magnetic particles of claim 1, the method comprising:
heat treating a plurality of nickel ferrite particles in a hydrogen atmosphere to form the plurality of magnetic particles having the iron nickel shell on the nickel ferrite core;
wherein the magnetic particles each independently comprise
a nickel ferrite core having the formula $Ni_{1-x}M_xFe_{2+y}O_4$, wherein M is at least one of Zn, Mg, Co, Cu, Al, Mn, or Cr; x is 0 to 0.95, and y=−0.5 to 0.5; and
an iron nickel shell at least partially surrounding the core, wherein the iron nickel shell comprises iron, nickel, and optionally M.

17. The method of claim 16, wherein the heat treating comprises heating the nickel ferrite particles to a temperature of 300 to 1,000° C.; and/or wherein the hydrogen atmosphere further comprises least one of nitrogen or argon.

18. The method of claim 16, where in the hydrogen atmosphere comprises 1 to 10 volume percent of hydrogen and 90 to 99 volume percent of argon or nitrogen.

19. The method of claim 16, further comprising forming the plurality of nickel ferrite particles by high energy ball mixing; wherein the high energy ball mixing comprises mixing nickel ferrite precursor compounds in a hardened chrome steel vial comprising a plurality of hardened chrome steel balls; wherein a mass ratio of the plurality of hardened chrome steel balls to the nickel ferrite precursor compounds is 20:1 to 40:1 during the high energy ball milling.

* * * * *